US012676340B2

(12) United States Patent
Kataoka et al.

(10) Patent No.: US 12,676,340 B2
(45) Date of Patent: Jul. 7, 2026

(54) COMPLEX OXIDE, ALL-SOLID-STATE LITHIUM ION SECONDARY BATTERY CONTAINING THIS COMPLEX OXIDE AS SOLID ELECTROLYTE AND METHOD FOR PRODUCING COMPLEX OXIDE

(71) Applicant: NATIONAL INSTITUTE OF ADVANCED INDUSTRIAL SCIENCE AND TECHNOLOGY, Tokyo (JP)

(72) Inventors: Kunimitsu Kataoka, Tsukuba (JP); Junji Akimoto, Tsukuba (JP); Sonoko Wakahara, Tsukuba (JP)

(73) Assignee: NATIONAL INSTITUTE OF ADVANCED INDUSTRIAL SCIENCE AND TECHNOLOGY (JP)

( * ) Notice: Subject to any disclaimer, the term of this patent is extended or adjusted under 35 U.S.C. 154(b) by 672 days.

(21) Appl. No.: 18/247,952

(22) PCT Filed: Aug. 30, 2021

(86) PCT No.: PCT/JP2021/031700
§ 371 (c)(1),
(2) Date: Apr. 5, 2023

(87) PCT Pub. No.: WO2022/074959
PCT Pub. Date: Apr. 14, 2022

(65) Prior Publication Data
US 2023/0378527 A1    Nov. 23, 2023

(30) Foreign Application Priority Data
Oct. 9, 2020    (JP) ................................. 2020-171286

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/0077* (2013.01)

(58) Field of Classification Search
CPC ......... H01M 10/0562; H01M 10/0525; H01M 2300/0077; H01M 2300/0068;
(Continued)

(56) References Cited

U.S. PATENT DOCUMENTS

2012/0107692 A1    5/2012    Harada et al.
2015/0099190 A1*   4/2015    Holme ................ C04B 35/4885
                                                     429/322
(Continued)

FOREIGN PATENT DOCUMENTS

CN          104169222 A     11/2014
CN          106145931 A     11/2016
(Continued)

OTHER PUBLICATIONS

Kataoka, Kunimitsu et al.: "Large single-crystal growth of tetragonal garnet-type $Li_7La_3Zr_2O_{12}$ by melting method", Solid State Ionics, vol. 349, Apr. 30, 2020, p. 115312, XP093233132, NL ISSN: 0167-2738, DOI: 10.1016/j.ssi.2020.115312, (online Apr. 30, 2020).
(Continued)

*Primary Examiner* — Tiffany Legette
*Assistant Examiner* — Ning Chen
(74) *Attorney, Agent, or Firm* — OSTROLENK FABER LLP

(57) ABSTRACT

Provided is a complex oxide having high density and high lithium ion conductivity and low activation energy. The complex oxide has a chemical composition represented by $Li_{4-x}Sr_{2-x}La_xZrO_6$ ($0 \leq x \leq 1.0$) and belongs to a monoclinic space group $P2_1/n$. The relative density of this complex oxide can be made to be 100%. The lithium ion conductivity of this complex oxide can be made to be $6.0 \times 10^{-4}$ S/cm or (Continued)

4e site Li 1
4e site Sr/La
2c site Zr
b
c ←—•a
4e site Li 2 more. This complex oxide is produced by melting at least a part of a raw material having a chemical composition represented by $Li_{(4-x)y}Sr_{(2-x)z}La_xZrO_6$ ($0 \leq x \leq 1.0$, $1 < y$ and $1 < z$) to form a molten portion and moving the molten portion at a movement speed of 8 mm/h or faster.

11 Claims, 6 Drawing Sheets

(58) Field of Classification Search
CPC ....... H01M 2300/0071; H01M 10/052; H01M 10/0585; C01G 25/00; C01G 35/006; C01G 25/006; C30B 29/22; C30B 13/00; H01B 1/08; Y02E 60/10
See application file for complete search history.

(56) References Cited

U.S. PATENT DOCUMENTS

| | | | |
|---|---|---|---|
| 2017/0222258 A1 | 8/2017 | Kataoka et al. | |
| 2017/0324079 A1 | 11/2017 | Kataoka et al. | |
| 2019/0341651 A1 | 11/2019 | Kataoka et al. | |
| 2020/0295400 A1 | 9/2020 | Harada et al. | |
| 2023/0420729 A1* | 12/2023 | Yoon ................. | H01M 10/0525 |

FOREIGN PATENT DOCUMENTS

| | | | |
|---|---|---|---|
| JP | H07-211352 A | 8/1995 | |
| JP | 2011-195373 A | 10/2011 | |
| JP | 2012-099287 A | 5/2012 | |
| JP | 6663685 B2 | 3/2020 | |
| JP | 2020-155399 A | 9/2020 | |
| WO | WO 2016-017769 A1 | 2/2016 | |
| WO | WO 2016-068040 A1 | 5/2016 | |
| WO | WO 2017-130622 A1 | 8/2017 | |
| WO | WO 2019-194290 A1 | 10/2019 | |

OTHER PUBLICATIONS

Li, Xu et al.: "Rational design of strontium antimony co-doped $Li_7La_3Zr_2O_{12}$ electrolyte membrane for solid-state lithium batteries", Journal of Alloys and Compounds, vol. 794, Apr. 30, 2020, pp. 347-357, XP085690040, ISSN: 0925-8388, DOI: 10.1016/J.JALLCOM.2019.04.274, (online Apr. 29, 2019).

Office Action dated Oct. 1, 2024 issued in corresponding Chinese Patent Application No. 202180068174.X, with English translation attached (total 14 pages).

Zha Wenping et al., "Research Advance of Inorganic Solid Electrolyte $Li_7La_3Zr_2O_{12}$", Materials China, vol. 36, No. 10, pp. 16-23, 43 (2017), (total 9 pages) with English translation of Abstract.

M.S. Shchelkanova et al., "Electrochemical properties of $Li_{8-2x}M_xZrO_6$ (M =Mg, Sr) solid electrolytes", Solid State Ionics, vol. 290, pp. 12-17, (2016) (total 6 pages).

Chaban, N. G. et al., "Lithium oxide-zinc oxide (magnesium oxide)-tin dioxide system", Zhurnal Neorganicheskoi Khimii, vol. 30, Issue 11, pp. 2922-2925 (total 4 pages), Dec. 31, 2018—See Concise Explanation of the Relevance in the English translation of CN Office Action attached.

International Search Report mailed Oct. 19, 2021 in corresponding PCT International Application No. PCT/JP2021/031700.

Pantyukhina, M. I., et al. "Ionic Conductivity of $Li_{8-2x}Sr_xZrO_6$", Inorganic Materials, vol. 48, No. 4, 2012, pp. 382-385.

Kataoka, Kunimitsu, et al. "Development of a Compact All-Solid-State Lithium Secondary Battery Using Single-Crystal Electrolyte—Towards realizing oxide-type all-solid-state lithium secondary batteries", Synthesiology, 2019, vol. 12, No. 1, pp. 28-38.

Inaguma, Yoshiyuki, et al. "High Ionic Conductivity in Lithium Lanthanum Titanate", Solid State Communications, vol. 86, No. 10, 1993, pp. 689-693.

Weiss, Manuel, et al. "Correlating Transport and Structural Properties in $Li_{1+x}Al_xGe_{2-x}(PO_4)_3$ (LAGP) Prepared from Aqueous Solution", ACS Applied Materials & Interfaces, vol. 10, 2018, pp. 10935-10944.

* cited by examiner

COMPLEX OXIDE, ALL-SOLID-STATE LITHIUM ION SECONDARY BATTERY CONTAINING THIS COMPLEX OXIDE AS SOLID ELECTROLYTE AND METHOD FOR PRODUCING COMPLEX OXIDE

CROSS-REFERENCES TO RELATED APPLICATIONS

The present application is a 35 U.S.C. §§ 371 national stage application of International Application No. PCT/JP2021/031700, filed Aug. 30, 2021, which claims priority to Japanese Patent Application No. 2020-171286, filed Oct. 9, 2020, the contents of which are incorporated herein by reference.

TECHNICAL FIELD

The present application relates to a complex oxide having a crystal structure with high density and high ion conductivity, a method for producing this complex oxide and an all-solid-state lithium ion secondary battery containing this complex oxide as a solid electrolyte material.

BACKGROUND ART

Lithium ion secondary batteries have a high energy density and can be operated at a high potential compared with secondary batteries such as nickel-cadmium batteries and nickel-hydrogen batteries. Therefore, lithium ion secondary batteries are being widely used in small information equipment such as mobile phones or notebook computers. In addition, since size reduction and weight reduction of lithium ion secondary batteries are easy to achieve, the demand therefor as secondary batteries for hybrid vehicles or electric vehicles is increasing.

Furthermore, in consideration of safety, research and development is underway regarding all-solid-state lithium ion secondary batteries where a flammable electrolytic solution is not used. Solid electrolytes that are used in all-solid-state lithium ion secondary batteries are required to have high lithium ion conductivity. As oxide-based materials having high lithium ion conductivity, materials having a cubic garnet-type structure have been reported (Patent Document 1), and research and development of these materials is progressing. Particularly, materials having a chemical composition $Li_{7-x}La_3Zr_{2-x}Ta_xO_{12}$ have high ion conductivity when x is near 0.5.

It is known that materials having this cubic garnet-type structure are hard to sinter and production of high-density compacts is difficult. In addition, solid electrolytes having this cubic garnet-type structure have high ion conductivity at room temperature, but the activation energy is near 0.45 ev, and the ion conductivity decreases at low temperatures. In order to realize high ion conductivity, there is a need to reduce grain boundary resistance and interface resistance, and thus solid materials that are high-density compacts, particularly, single crystal materials, are desirable as solid electrolytes. Single crystal materials are not affected by grain boundaries and are thus expected to have a high lithium ion conductive property. In addition, single crystal materials are capable of preventing short circuits between positive and negative electrodes in charging and discharging processes and enable thickness reduction and thus provide the possibility of size reduction of all-solid-state lithium ion secondary batteries in the future.

Based on these problems, there have been reports of growing a single crystal of $Li_{7-x}La_3Zr_{2-x}Ta_xO_{12}$ or $Li_{7-x}La_3Zr_{2-x}Nb_xO_{12}$ having a garnet-type structure using a melting method (Patent Document 2 and Patent Document 3). In addition, as additional oxide-based materials exhibiting high lithium ion conductivity, a material having a perovskite-type structure (Non-Patent Document 1) or a material having a polyanionic NASION-type structure (Non-Patent Document 2) has been reported. As described above, there have been a number of reported examples regarding cubic garnet-type solid electrolytes, perovskite-type solid electrolytes and NASICON-type solid electrolytes each having high lithium ion conductive property, but only a few examples have been reported regarding a material having a different structure.

CITATION LIST

Patent Document

[Patent Document 1]
Japanese Unexamined Patent Application, Publication No. 2011-195373
[Patent Document 2]
PCT International Publication No. WO 2016/068040
[Patent Document 3]
PCT International Publication No. WO 2017/130622

Non-Patent Document

[Non-Patent Document 1]
Solid state communications, 86, p. 689 to 693, 1993
[Non-Patent Document 2]
Applied materials and interfaces, 10, p. 10935 to 10944, 2018

SUMMARY OF INVENTION

Technical Problem

The present application has been made in consideration of such circumstances, and an objective thereof is to develop a novel solid electrolyte having high density and high lithium ion conductivity and having low activation energy.

Solution to Problem

The inventors of the present application found that, when a mixed raw material blended to be $Li_{(4-x)y}Sr_{(2-x)z}La_xZrO_6$ ($0 \leq x \leq 1.0$, y=1.2 and z=1.2) is formed into a rod shape, and then this compact is melted and rapidly cooled by an FZ method using infrared condensed heating, it is possible to produce a rod of a high-density complex oxide single crystal represented by $Li_{4-x}Sr_{2-x}La_xZrO_6$ ($0 \leq x \leq 1.0$). That is, the growth of a single crystal of a solid electrolyte having a new crystal structure that is different from the cubic garnet-type structure, the perovskite-type structure and the NASICON-type structure and for which analogue crystal structures have never been reported was achieved.

The thickness of a silicon single crystal can be reduced by polishing using a wire saw. A rod of the high-density complex oxide single crystal of the present application also has high strength. Therefore, the high-density complex oxide single crystal of the present application can also be easily cut with a diamond cutter or the like. The inventors of the present application also found that it is possible to produce a thin piece having a thickness of approximately 0.1 mm of a complex oxide single crystal represented by $Li_{4-x}Sr_{2-x}La_xZrO_6$ ($0 \leq x \leq 1.0$). It is possible to reduce the thickness of this complex oxide single crystal to approximately 0.03 mm.

The complex oxide of the present application has a chemical composition represented by $Li_{4-x}Sr_{2-x}La_xZrO_6$ ($0 \leq x \leq 1.0$) and belongs to a monoclinic space group $P2_1/n$.

In a method for producing a complex oxide of the present application, at least a part of a raw material having a chemical composition represented by $Li_{(4-x)y}Sr_{(2-x)z}La_xZrO_6$ ($0 \leq x \leq 1.0$, $1 < y$ and $1 < z$) is melted to form a molten portion and the molten portion is moved at a movement speed of 8 mm/h or faster to produce a complex oxide having a chemical composition represented by $Li_{4-x}Sr_{2-x}La_xZrO_6$ ($0 \leq x \leq 1.0$), having a relative density of 99% or more and belonging to a monoclinic space group $P2_1/n$.

An all-solid-state lithium ion secondary battery of the present application has a positive electrode, a negative electrode and a solid electrolyte, and the solid electrolyte is composed of the complex oxide of the present application.

Advantageous Effects of Invention

According to the present application, a complex oxide $Li_{4-x}Sr_{2-x}La_xZrO_6$ ($0 \leq x \leq 1.0$) having high density and high ion conductivity and having low activation energy and an all-solid-state lithium ion secondary battery in which this complex oxide is used as a solid electrolyte material are obtained.

DESCRIPTION OF EMBODIMENTS

Figure 1:
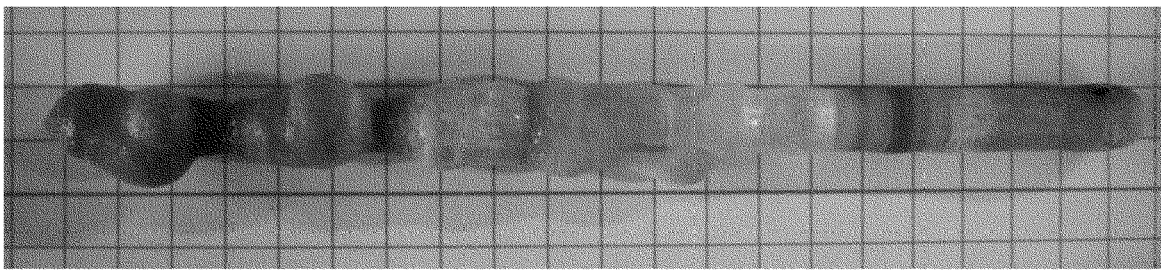
FIG. 1 is a photograph of the external appearance of a $Li_{3.957}Sr_{1.957}La_{0.043}ZrO_6$ single crystal obtained in Example 1.

The inventors of the present application intensively studied a method for melting and cooling a mixed raw material containing an excess of lithium and strontium compared with the composition proportions of a target complex oxide. As a result, the inventors of the present application found that a complex oxide single crystal of $Li_{4-x}Sr_{2-x}La_xZrO_6$ ($0 \leq x \leq 1.0$) that belongs to the monoclinic system can be produced by this method. In addition, the inventors of the present application confirmed that a thin piece of this single crystal can be mechanically produced and completed inventions to be disclosed in the present application. A complex oxide of an embodiment of the present application has a chemical composition represented by $Li_{4-x}Sr_{2-x}La_xZrO_6$ ($0 \leq x \leq 1.0$), being monoclinic and belongs to a space group $P2_1/n$.

The high-density single crystal of the present embodiment belonging to the monoclinic system and having a crystal structure for which no analogue crystal structures have been thus far reported cannot be produced by a normal FZ method in which a sample rod is rotated at slower than 20 rpm and a molten portion of the sample rod is lowered at a movement speed of approximately 2 mm/h. This is because cavities enter $Li_{4-x}Sr_{2-x}La_xZrO_6$ ($0 \leq x \leq 1.0$). When a molten portion of a mixed raw material having a rod shape is lowered at a movement speed of 8 mm/h or faster while rotating the mixed raw material at a rotation speed of 20 rpm or faster and this molten portion is cooled at a high speed, a crystal with no cavities can be produced.

A rod of the obtained high-density complex oxide $Li_{4-x}Sr_{2-x}La_xZrO_6$ ($0 \leq x \leq 1.0$) can be cut to an arbitrary thickness with a diamond cutter or the like. In addition, the complex oxide raw crystal of the present embodiment can be produced by melting a mixed raw material in which the amounts of lithium and strontium are increased with respect to the stoichiometric proportion of each metal in the chemical composition $Li_{4-x}Sr_{2-x}La_xZrO_6$ ($0 \leq x \leq 1.0$) in consideration of the fact that lithium and strontium volatilize at high temperatures.

The relative density of the complex oxide of the present embodiment is preferably 99% or more and particularly preferably 100%. The relative density is calculated by measuring the outline of a produced thin piece, calculating the apparent volume and dividing the apparent density calculated from a measured mass by a true density that is obtained from a single crystal X-ray structural analysis result. The complex oxide of the present embodiment has high density and thus can be easily cut to an arbitrary thickness with a diamond cutter or the like.

In addition, the complex oxide of the present embodiment can be used as a solid electrolyte material having high ion conductivity (for example, $6.0 \times 10^{-4}$ S/cm or more) and low activation energy (for example, 0.20 eV or more and 0.30 eV or less). Specifically, $Li_{3.957}Sr_{1.957}La_{0.043}ZrO_6$ can be used as a solid electrolyte material having lithium ion conductivity of $6.0 \times 10^{-4}$ S/cm or more and an activation energy of 0.24 eV.

The complex oxide of the present embodiment is produced by melting at least a part of a raw material having a chemical composition represented by $Li_{(4-x)y}Sr_{(2-x)z}La_xZrO_6$ ($0 \leq x \leq 1.0$, $1 < y$ and $1 < z$) to form a molten portion and moving the molten portion at a movement speed of 8 mm/h or faster. Specifically, the complex oxide single crystal of the present embodiment is grown by an FZ method, a Czochralski (Cz) method, a Bridgman method, a pedestal method or the like. An appropriate production method may be selected from these depending on the desired size, shape and the like of the crystal of the complex oxide to be produced.

A crystal of a complex oxide $Li_{4-x}Sr_{2-x}La_xZrO_6$ ($0 \leq x \leq 1.0$) having a relative density of 100%, that is, a single crystal of the original complex oxide $Li_{4-x}Sr_{2-x}La_xZrO_6$ ($0 \leq x \leq 1.0$), can be produced by the FZ method or the Cz method. The single crystal of the complex oxide $Li_{4-x}Sr_{2-x}La_xZrO_6$ ($0 \leq x \leq 1.0$) having a relative density of 100% has characteristics of a high lithium ion conductive property and low activation energy. In the case of producing the complex oxide of the present embodiment by the FZ method, a crystal is grown by melting a rod-shaped raw material while rotating the raw material on a surface perpendicular to the longitudinal direction of the raw material at a rotation speed of 20 rpm or faster and moving a molten portion in the longitudinal direction.

When the movement speed of the molten portion is set to be as fast as 8 mm/h or faster, decomposition of the raw material caused by lithium volatilization can be avoided. The movement speed of this molten portion is preferably 8 mm/h or faster and 19 mm/h or slower. In addition, in the molten portion, volatilization of lithium generates bubbles, but the bubbles can be removed by setting the rotation speed of the rod-shaped raw material to be as fast as 20 rpm or faster. The rotation speed of the raw material is preferably 20 rpm or faster and 60 rpm or slower. In addition, the melting of the raw material and the movement of the molten portion are preferably performed in a dry air atmosphere. A crystal of $Li_{4-x}Sr_{2-x}La_xZrO_6$ ($0 \leq x \leq 1.0$) having a relative density of 99% or more can be produced as described above.

A method for producing the complex oxide of the present embodiment will be described more specifically using the growth of a crystal of $Li_{4-x}Sr_{2-x}La_xZrO_6$ ($0 \leq x \leq 1.0$) having a relative density of 99% or more and belonging to the monoclinic system, for which no analogue crystal structures have been thus far reported, as an example. First, a rod-shaped raw material is produced as described below. In the beginning, in consideration of the fact that lithium salts and strontium salts volatilize at high temperatures, a lithium compound, a strontium compound, a lanthanum compound and a zirconium compound are weighed so that Li:Sr:La:Zr becomes the stoichiometric proportions (so-called mole proportions) of $(4-x)y:(2-x)z:x:1$ ($0 \leq x \leq 1.0$, $1 < y$ and $1 < z$). y and z are preferably 1.1 or more and more preferably 1.15 or more and 1.25 or less.

The lithium compound is not particularly limited as long as lithium is contained, and examples thereof include oxides such as $Li_2O$, carbonates such as $Li_2CO_3$ and the like. The strontium compound is not particularly limited as long as strontium is contained, and examples thereof include oxides such as $SrO$, carbonates such as $SrCO_3$ and chlorides such as $SrCl_2$. The lanthanum compound is not particularly limited as long as lanthanum is contained, and examples thereof include oxides such as $La_2O_3$, hydroxides such as $La(OH)_3$ and the like. The zirconium compound is not particularly limited as long as zirconium is contained, and examples thereof include oxides such as $ZrO_2$, chlorides such as $ZrCl_4$ and the like.

In addition, compounds composed of two or more elements selected from lithium, strontium, lanthanum and zirconium may be used and weighed so that Li:Sr:La:Zr becomes the mole proportions of $(4-x)y:(2-x)z:x:1$ ($0 \leq x \leq 1.0$, $1 < y$ and $1 < z$). Examples of such compounds composed of two or more elements include lithium zirconium oxides such as $LiZrO_3$, strontium zirconium oxides such as $SrZrO_4$ and the like.

Next, the weighed individual compounds are mixed together. The mixing method is not particularly limited as long as these individual compounds can be uniformly mixed, and the compounds may be mixed using, for example, a mixing machine such as a mixer by a wet method or a dry method. In addition, the obtained mixture is loaded into a crucible with a lid, then, preliminarily baked at 600° C. to 900° C., preferably at 650° C., loaded into a rubber tube or the like to be made into a rod shape and then formed by isostatic pressing, whereby a powder that serves as a raw material is obtained. It is more preferable to repeatedly crush, mix and bake the raw material that has been once preliminarily baked one more time.

Next, the obtained raw material powder is crushed to decrease particle sizes in order to make forming easy. The crushing method is not particularly limited as long as the powder can be made fine, and the raw material powder may be crushed using, for example, a crushing device such as a planetary ball mill, a hot mill or a bead mill by a wet method or a dry method. In addition, the obtained crushed object is loaded into a rubber tube and then formed into a rod shape by isostatic pressing. Next, the obtained rod-shaped compact is baked at approximately 600° C. to 850° C., preferably 700° C. to 850° C., for approximately four hours, whereby a rod-shaped raw material is obtained. At this point in time, the chemical composition of the raw material is $Li_{(4-x)y}Sr_{(2-x)z}La_xZrO_6$ ($0 \leq x \leq 1.0$, $1 < y$ and $1 < z$).

In addition, this rod-shaped raw material is melted in an infrared condensed heating furnace and then rapidly cooled, whereby $Li_{4-x}Sr_{2-x}La_xZrO_6$ ($0 \leq x \leq 1.0$) having a relative density of 99% or more and belonging to the monoclinic system, for which no analogue crystal structures are known, is produced. A single crystal of $Li_{4-x}Sr_{2-x}La_xZrO_6$ ($0 \leq x \leq 1.0$) having a length of 2 cm or longer is obtained by this production method. Therefore, thin pieces having the same qualities can be easily produced by cutting.

In the case of producing a high-density single crystal of $Li_{4-x}Sr_{2-x}La_xZrO_6$ ($0 \leq x \leq 1.0$) by the CZ method, the single crystal is produced by the following procedure. First, a raw material is put into a crucible and heated to be melted. Next, a seed crystal is dipped in the melt of the raw material and lifted while being rotated. It is considered that, when the movement speed of a molten portion, that is, the lifting speed of the seed crystal is set to be as fast as 8 mm/h or faster, the volatilization of lithium and strontium is suppressed and a high-density $Li_{4-x}Sr_{2-x}La_xZrO_6$ ($0 \leq x \leq 1.0$) crystal can be obtained.

In addition, the high-density complex oxide $Li_{4-x}Sr_{2-x}La_xZrO_6$ ($0 \leq x \leq 1.0$) of the present embodiment has an excellent lithium ion conductive property and thus can be used as a solid electrolyte for all-solid-state lithium ion secondary batteries. That is, an all-solid-state lithium ion secondary battery of the embodiment of the present application has a positive electrode, a negative electrode and a solid electrolyte, and the solid electrolyte is composed of the complex oxide of the present embodiment. Hereinafter, the inventions disclosed in the present application will be described more specifically using examples. The inventions disclosed in the present application are not limited to these examples by any means.

Example 1

(Production of Powdery Mixed Raw Material of $Li_{4.7484}Sr_{2.3484}La_{0.043}ZrO_6$)

13.4461 g of lithium carbonate $Li_2CO_3$ (manufactured by Rare Metallic Co., Ltd., purity: 99.99% (the same below)), 26.5725 g of strontium carbonate $SrCO_3$ (manufactured by Rare Metallic Co., Ltd., purity: 99.99% (the same below)), 0.5369 g of lanthanum oxide $La_2O_3$ (manufactured by Rare Metallic Co., Ltd., purity: 99.99% (the same below)) and 9.4445 g of zirconium oxide $ZrO_2$ (manufactured by Rare Metallic Co., Ltd., purity: 99.99% (the same below)) were put into an agate mortar and uniformly mixed together by a wet method in which ethanol was used. The lanthanum oxide had been preliminarily baked at 900° C. in advance before use.

Regarding the mole proportions Li:Sr:La:Zr of metals in this mixture, there were an excess of lithium (20 mol %) and an excess of strontium (20 mol %) with respect to the mole proportions of a target object $Li_{3.957}Sr_{1.957}La_{0.043}ZrO_6$ ($Li_{4-x}Sr_{(2-x)}La_xZrO_6$ where x=0.043)). That is, the chemical composition of this mixture corresponds to $Li_{4.7484}Sr_{2.3484}La_{0.043}ZrO_6$ ($Li_{(4-x)y}Sr_{(2-x)z}La_xZrO_6$ where x=0.043, y=1.2 and z=1.2).

50.000 g of this mixture was loaded into an alumina crucible with a lid (manufactured by Nikkato Corporation, C3 type). This was put into a box-type electric furnace (manufactured by Yamato Scientific Co., Ltd., FP100 type) and preliminarily baked at 650° C. for six hours, thereby obtaining a powder. 50 g of the obtained powder, 300 g of zirconia balls having a diameter of 5 mm and 100 g of isopropanol were loaded into a zirconia crushing container having a capacity of 250 mL and rotated using a planetary ball mill (manufactured by Fritsch GmbH, Model P-6) at a revolution speed of 200 rpm for a total of 300 minutes, thereby crushing this powder. The crushed powder was dried at 100° C. for 24 hours and classified using a sieve having a mesh size of 250 μm, thereby obtaining a powdery mixed raw material.

(Production of Rod-Shaped Raw Material)

A rod-shaped raw material was produced using the powdery mixed raw material obtained above by the following procedure. 15.127 g of this powdery mixed raw material was loaded into a rubber die and degassed. This die was put into water in a sealed state and maintained at 40 MPa for five minutes. After the pressure of the water was decreased, a compact was removed from the die. The compact had a cylindrical shape that was 1.1 cm in diameter and 8.0 cm in height. This cylindrical compact was baked using a box-type electric furnace (manufactured by Denken Co., Ltd., Model No. KDF009) at 850° C. for four hours. The removed compact, that is, a rod-shaped raw material had a cylindrical shape that was 1.0 cm in diameter and 7.7 cm in height.

(Growth of Crystal of $Li_{3.957}Sr_{1.957}La_{0.043}ZrO_6$)

The rod-shaped raw material obtained above was installed in a four-ellipse type infrared condensed heating furnace equipped with a 1 kW halogen lamp (FZ furnace) (manufactured by Crystal Systems Corporation, FZ-T-10000H type), and a dry air atmosphere was formed. The rod-shaped raw material was heated at an output of 21.3% while being rotated on a surface perpendicular to the longitudinal direction at 40 rpm. After a short time, a part of this rod-shaped raw material, which was a polycrystalline sample, was melted to form a molten portion. The installation table of this rod-shaped raw material was lowered at a movement speed of 10 mm/h, thereby growing a high-density complex oxide $Li_{3.957}Sr_{1.957}La_{0.043}ZrO_6$ (hereinafter, referred to as "sample 1" in some cases). The chemical composition of the sample 1 was analyzed by single crystal X-ray crystal structural analysis. The external appearance of the sample 1 is shown in FIG. 1. As shown in FIG. 1, it was possible to produce a high-density crystal of $Li_{3.957}Sr_{1.957}La_{0.043}ZrO_6$ having a length of 7 cm.

(Evaluation of Crystal of $Li_{3.957}Sr_{1.957}La_{0.043}ZrO_6$)

Figure 2:
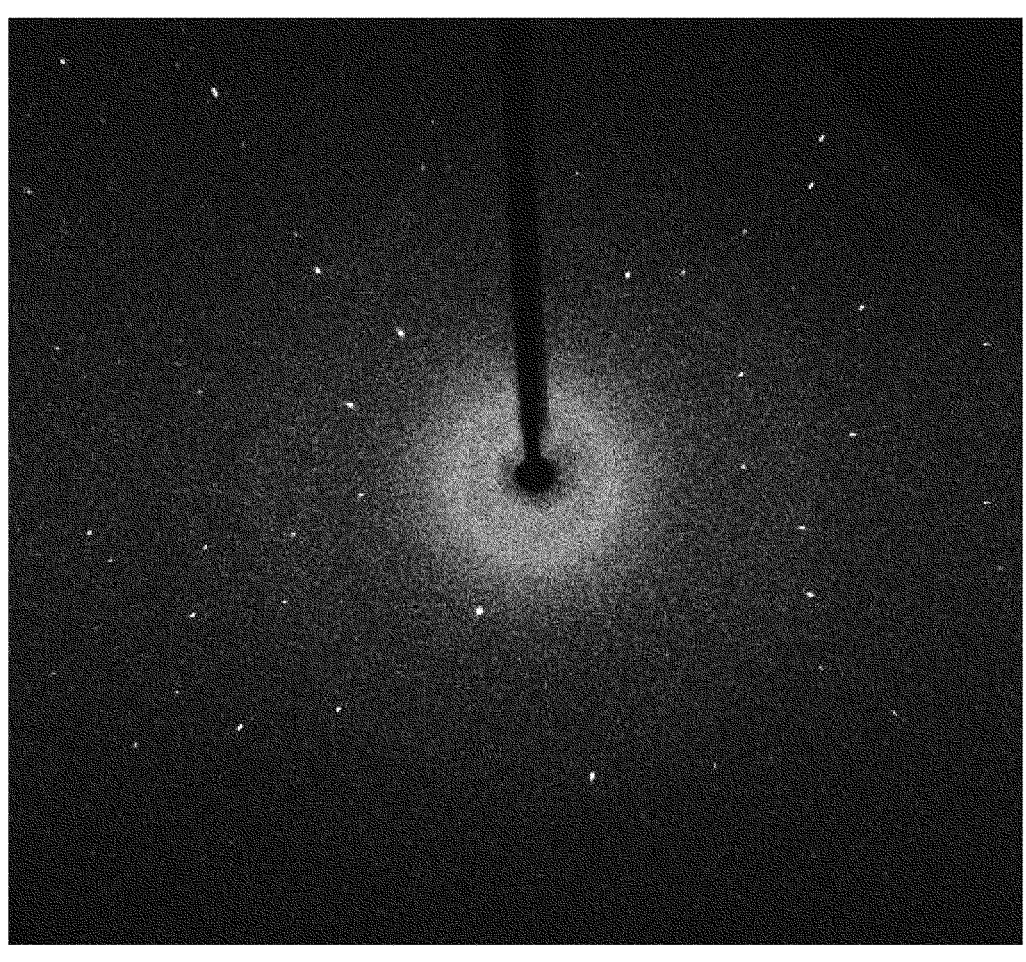
FIG. 2 is a single crystal X-ray diffraction pattern of the $Li_{3.957}Sr_{1.957}La_{0.043}ZrO_6$ single crystal obtained in Example 1.

The structure of the sample 1 was investigated using a single crystal X-ray diffractometer having a two-dimensional IP detector (manufactured by Rigaku Corporation, R-AXIS RAPID-II). The X-ray diffraction pattern of the sample 1 is shown in FIG. 2. As shown in FIG. 2, it was possible to measure a clear diffraction point. Lattice constants were calculated from the diffraction point by the least squares method, which showed that the lattice constant a was 0.57506 nm±0.00014 nm, b was 0.62968 nm±0.00018 nm, c was 0.84906 nm±0.00026 nm and the β angle was 97.048°±0.0120.

As a result of collecting the diffraction intensity data of sample 1, building a model of the initial crystal structure with a program SUPERFLIP including a charge-flipping method and investigating the crystal structure with a crystal structural analysis program Jana2006, it was found that the sample 1 belonged to the monoclinic system. The sample 1 was cut with a diamond cutter to produce four thin pieces each having a thickness of 0.1 mm, and the relative densities thereof were calculated by the above-described method. As a result, these relative densities were each 99.5%, 99.8%, 99.9% or 100%. As described above, a complex oxide having a relative density of 99.5% or more was obtained.

Figure 3:
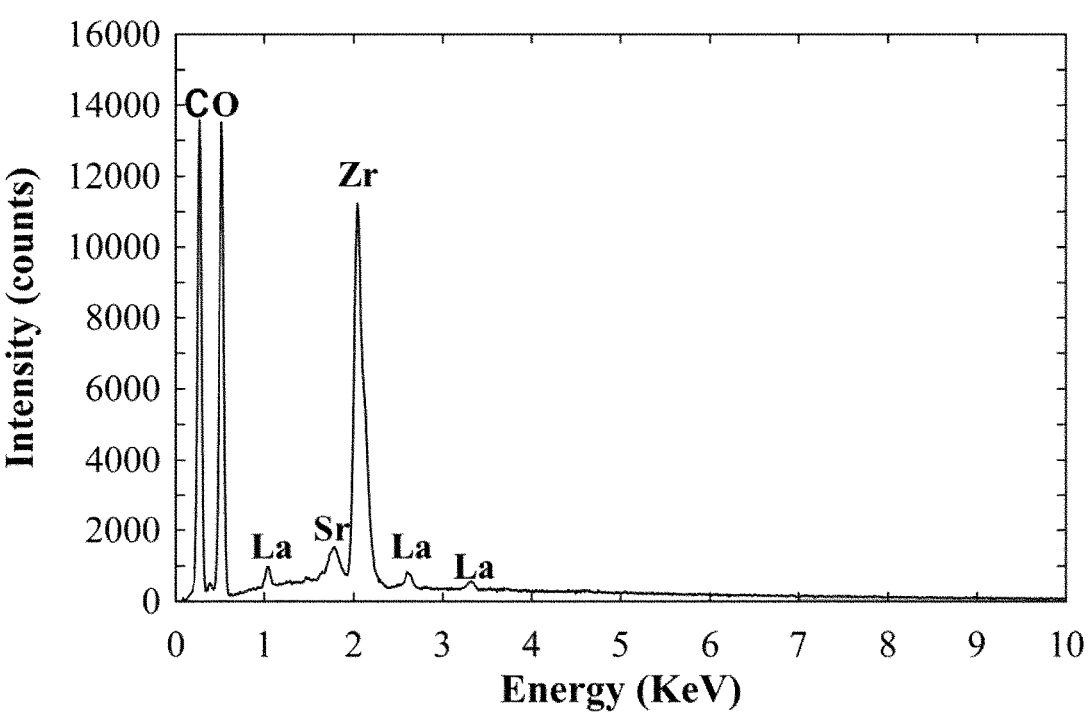
FIG. 3 is an energy dispersive X-ray spectroscopy spectrum of the $Li_{3.957}Sr_{1.957}La_{0.043}ZrO_6$ single crystal obtained in Example 1.

Energy dispersive X-ray spectroscopic measurement of the sample 1 was performed with an energy dispersive X-ray spectroscopy device (manufactured by JEOL Ltd., JCM-6000) attached to a scanning electron microscope. As a result, it was possible to acquire spectral data as shown in FIG. 3, and it was found that the elements contained in the single crystal were Sr, La, Zr and O. The spectrum of carbon comes from the influence of conductive tape for pasting the sample. In addition, the chemical composition was analyzed using an inductively coupled plasma-mass spectrometry device (manufactured by Thermo Fisher Scientific Inc., iCAP Qs) in which the single crystal was used. As a result, the mole proportions Li:Sr:La:Zr of the sample 1 were 3.96:1.96:0.04:1.

Figure 4:
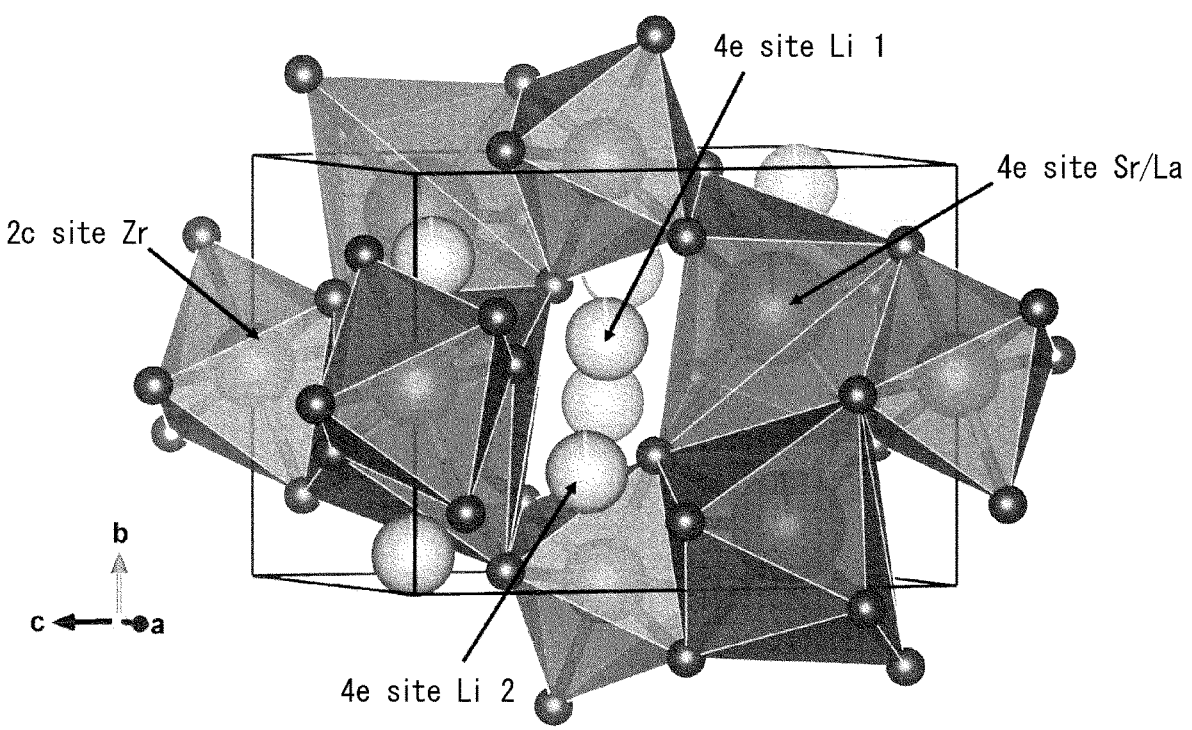
FIG. 4 is a schematic view showing the crystal structure of the $Li_{3.957}Sr_{1.957}La_{0.043}ZrO_6$ single crystal obtained in Example 1.

FIG. 4 schematically shows the structure of the sample 1. The sample 1 had a crystal structure for which no analogue crystal structures have been thus far reported. $Li_{3.957}Sr_{1.957}La_{0.043}ZrO_6$ belonged to a space group $P2_1/n$, two kinds of 4e sites in the crystal structure were occupied by lithium ions, one 4e site was occupied by a solid solution of strontium and lanthanum, a 2c site was occupied by zirconium and three kinds of 4e sites were occupied by oxygen. An R factor, which indicates the degree of reliability of this crystal structural analysis, was 1.78%, and thus the crystal structural analysis result can be said to be reasonable.

In addition, the arrangement of lithium ions in the crystal structure of this complex oxide has a three-dimensional lithium path, and, particularly, in a one-dimensional direction, the distance between the lithium ions is close and lithium ion sites are appropriately missing. Therefore, it is considered that the sample 1 has a high lithium ion conductive property and can be applied as a solid electrolyte material. The sample 1 was cut to produce a thin piece that was approximately 0.50 cm in diameter and approximately 0.10 cm in thickness. Gold having a cylindrical shape having a thickness of 40 nm was sputtered in a round shape having a 0.40 cm×0.40 cm bottom surface on the front side and rear side of this thin piece to form electrodes.

Figure 5:
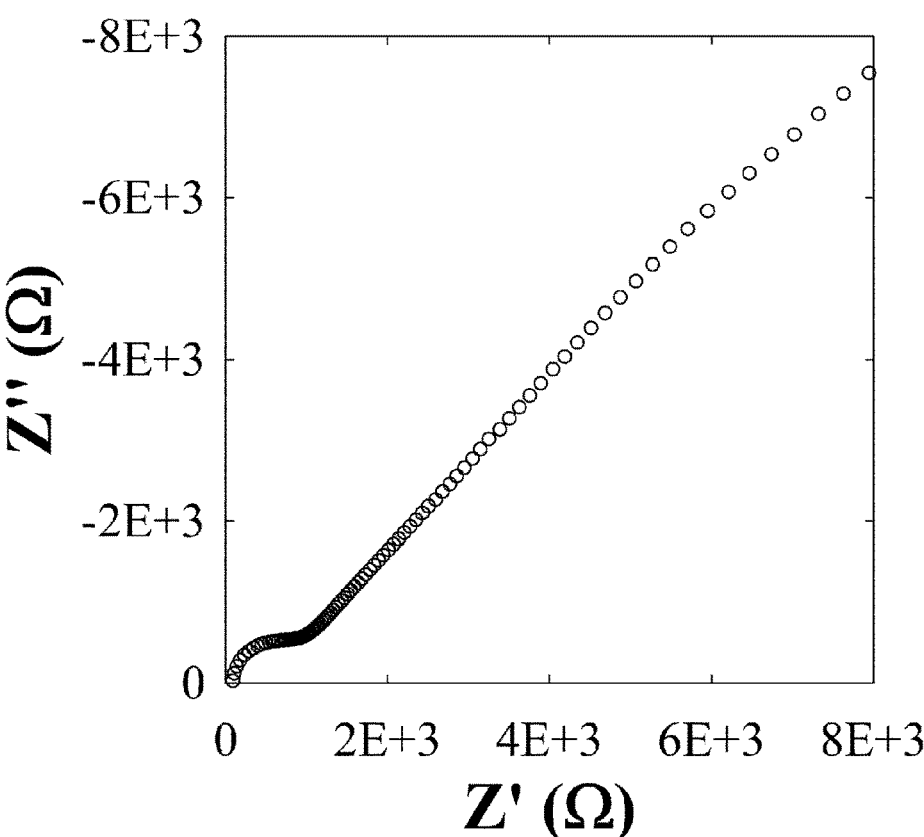
FIG. 5 is a Nyquist plot by an alternating current impedance method of the $Li_{3.957}Sr_{1.957}La_{0.043}ZrO_6$ single crystal obtained in Example 1.
Figure 6:
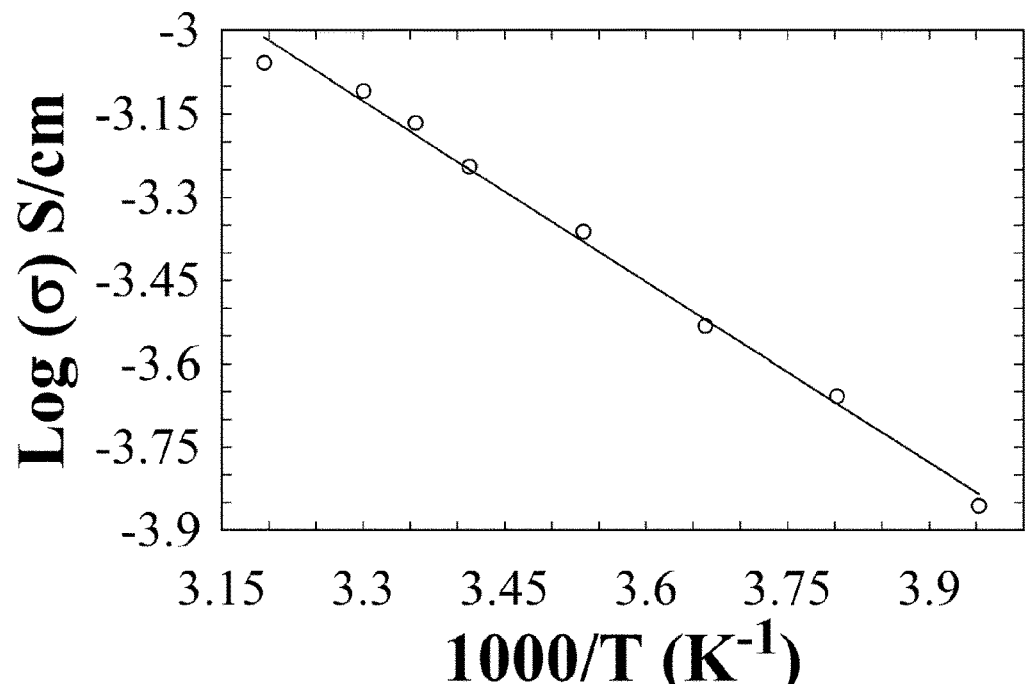
FIG. 6 is a graph showing a relationship between the lithium ion conductivity obtained by the alternating current impedance method of the $Li_{3.957}Sr_{1.957}La_{0.043}ZrO_6$ single crystal obtained in Example 1 and the temperature.

As a result of measuring the lithium ion conductivity of this sample by an alternating current impedance method (measuring instrument: Solarton, 1260) at 25° C. in a nitrogen atmosphere, a Nyquist plot shown in FIG. 5 was obtained. The lithium ion conductivity of this sample was calculated from the total resistance value and found out to be $6.8\times10^{-4}$ S/cm. In addition, the lithium ion conductivity of the sample 1 was measured in a temperature range of −20° C. to 40° C. When applied to the Arrhenius equation, the activation energy was 0.24 eV. FIG. 6 shows a change in the lithium ion conductivity of the sample 1 over temperatures.

At −20° C., the lithium ion conductivity ($1.3×10^{-4}$ S/cm) of the sample 1 was higher than the lithium ion conductivity ($6.2×10^{-5}$ S/cm) of solid electrolytes having a cubic garnet-type structure.

(Production of all-Solid-State Lithium Ion Secondary Battery)

0.0105 mol of lithium acetate dihydrate (manufactured by Sigma-Aldrich Co. LLC) and 0.01 mol of cobalt acetate tetrahydrate (manufactured by Wako Pure Chemical Industries, Ltd.) were dissolved in 100 g of ethylene glycol (manufactured by Wako Pure Chemical Industries, Ltd.). 10 g of polyvinyl pyrrolidone K-30 (manufactured by Wako Pure Chemical Industries, Ltd.) was added thereto and dissolved therein, thereby preparing 0.1 mol/kg of a lithium cobaltate precursor solution. The reason for setting the amount of lithium acetate to be 5% larger than the amount of cobalt acetate in terms of mole proportion is to compensate for the amount of lithium to be volatilized during baking.

Figure 7:
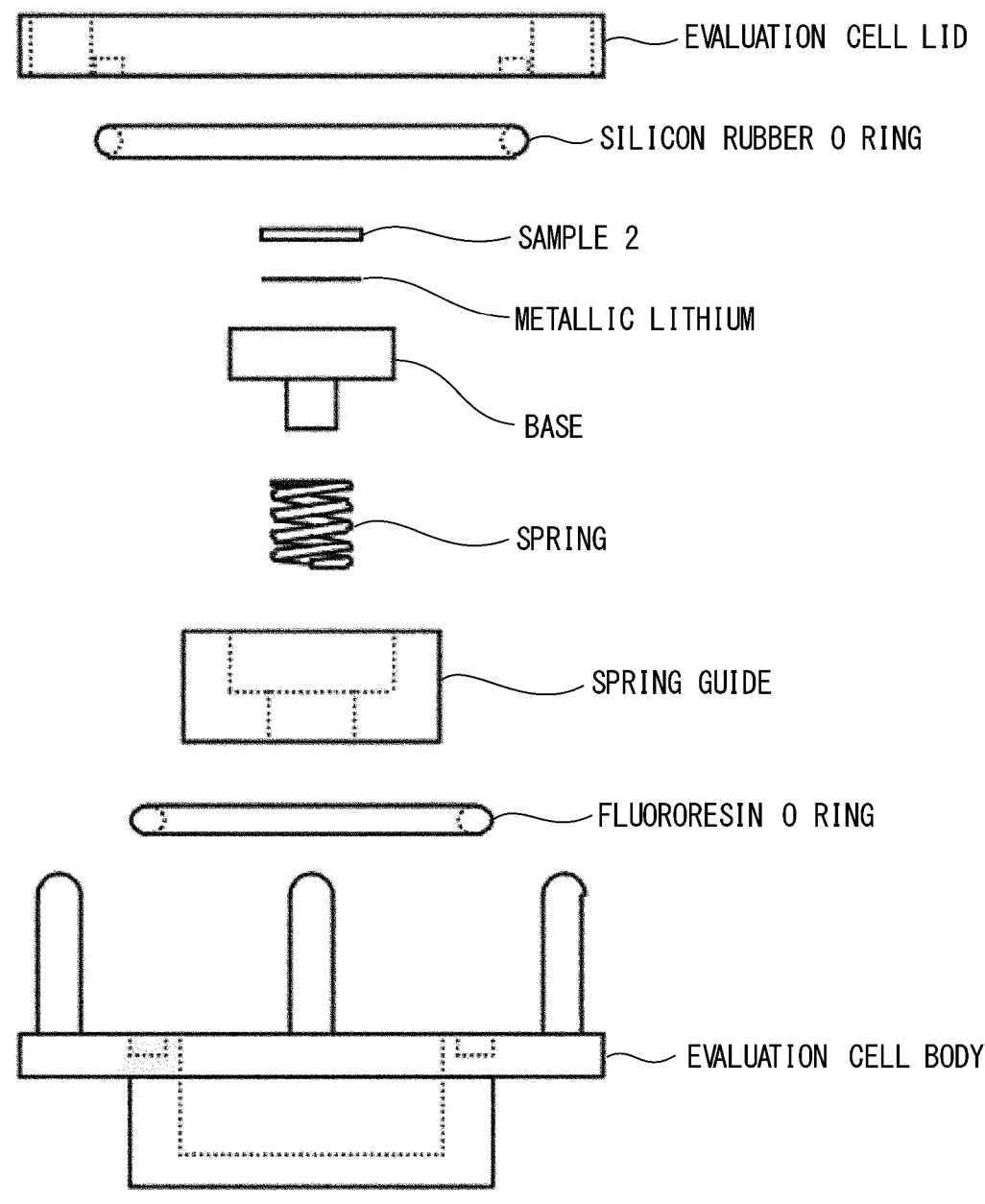
FIG. 7 is a schematic exploded view of an all-solid-state lithium ion secondary battery produced in Example 1.

The sample 1 was cut to produce a thin piece that was approximately 0.6 cm in diameter and approximately 0.10 cm in thickness. 10 μL of the precursor solution was added dropwise onto a single surface of this thin piece and preliminarily baked at 400° C. for 20 minutes. After that, the precursor solution was baked at 850° C. for 10 minutes, thereby producing a sample having a lithium cobaltate positive electrode formed on a single surface of the sample 1 (hereinafter, referred to as "sample 2" in some cases). Sample 2 and a metallic lithium plate blanked to a diameter of 4 mm were put into a commercially available HS cell for battery evaluation (manufactured by Hosen Corporation) in a glove box, and an all-solid-state lithium ion secondary battery as shown in FIG. 7 was produced. This all-solid-state lithium ion secondary battery was confirmed to function as a battery from the fact that an open-circuit voltage of 2.7 V was shown.

Example 2

(Production of Powdery Mixed Raw Material of $Li_4Sr_2ZrO_6$)

A powdery mixed raw material was obtained in the same manner as in Example 1 except that 14.1793 g of lithium carbonate $Li_2CO_3$, 25.9684 g of strontium carbonate $SrCO_3$ and 9.8524 g of zirconium oxide $ZrO_2$ were used. Regarding the mole proportions Li:Sr:Zr of metals in this powdery mixed raw material, there were an excess of lithium (20 mol %) and an excess of strontium (20 mol %) with respect to the mole proportions of a target object $Li_4Sr_2ZrO_6$. That is, the chemical composition of this powdery mixed raw material corresponds to $Li_{4.4}Sr_{2.2}ZrO_6$ ($Li_{(4-x)y}Sr_{(2-x)z}La_xZrO_6$ where x=0, y=1.2 and z=1.2).

(Production of Rod-Shaped Raw Material)

A compact was obtained in the same manner as in Example 1 except that 14.111 g of the powdery mixed raw material obtained above was used. This compact had a cylindrical shape that was 1.2 cm in diameter and 6.0 cm in height. After that, the compact was baked under the same conditions as in Example 1 to obtain a rod-shaped raw material. The obtained rod-shaped raw material had a cylindrical shape that was 1.1 cm in diameter and 5.3 cm in height.

(Growth of Crystal of $Li_4Sr_2ZrO_6$)

Figure 8:
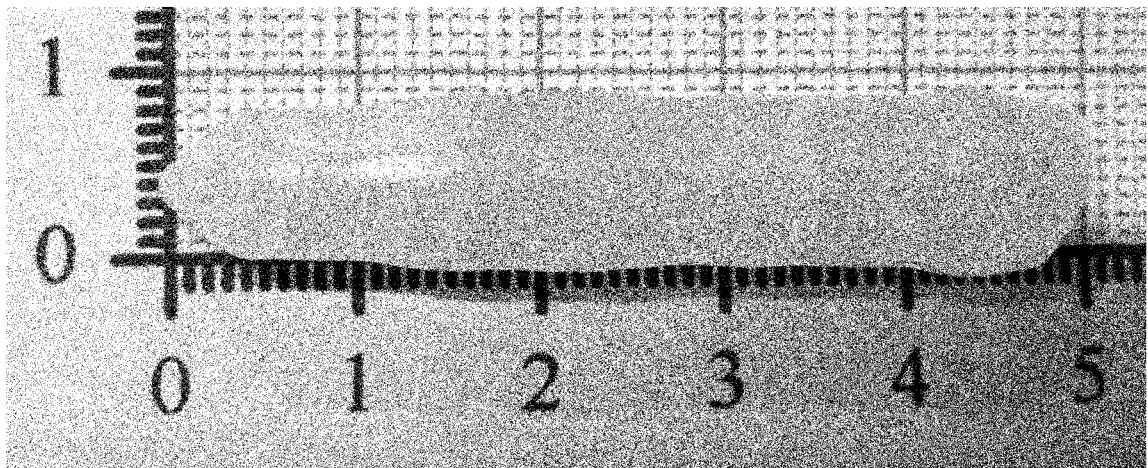
FIG. 8 is a photograph of the external appearance of a $Li_4Sr_2ZrO_6$ single crystal obtained in Example 2.

A high-density complex oxide $Li_4Sr_2ZrO_6$ (hereinafter, referred to as "sample 3" in some cases) was grown in the same manner as in Example 1 except that the rod-shaped raw material was heated at an output of 19.8%, and the chemical composition was analyzed. The external appearance of the sample 3 is shown in FIG. 8. As shown in FIG. 8, it was possible to produce a high-density crystal of $Li_{4y}Sr_{2z}ZrO_6$ having a length of 5 cm.

(Evaluation of Crystal of $Li_4Sr_2ZrO_6$)

Figure 9:
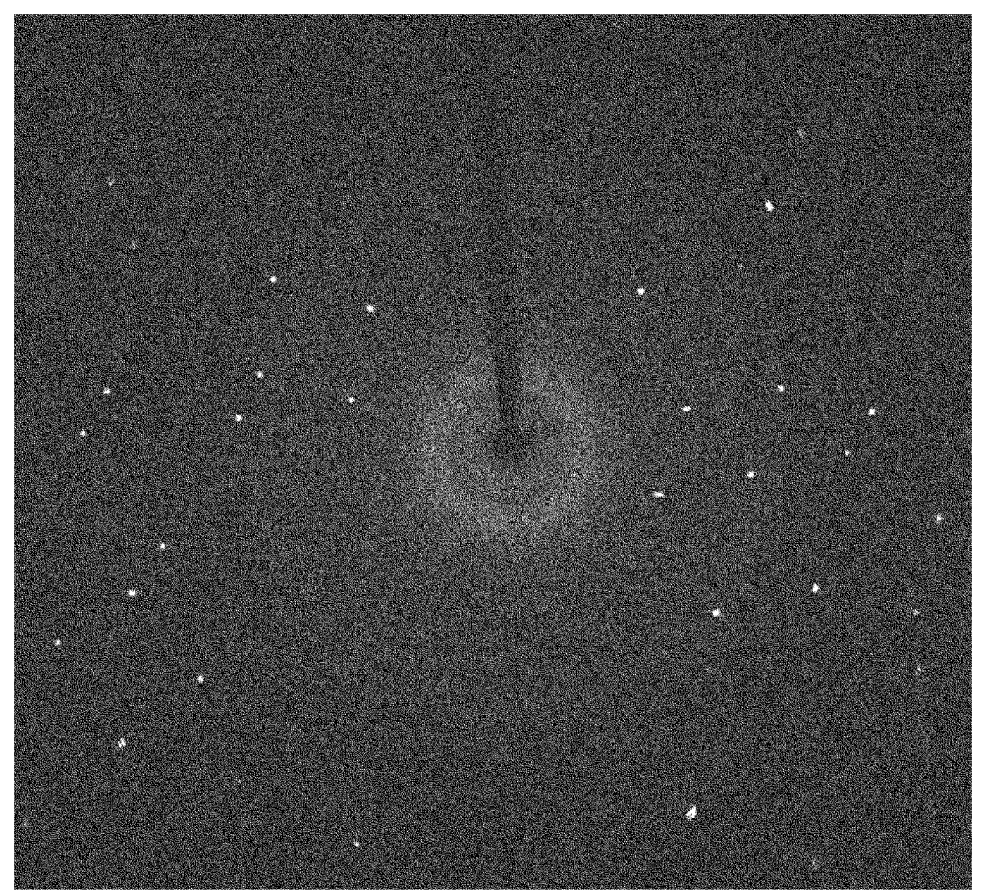
FIG. 9 is a single crystal X-ray diffraction pattern of the $Li_4Sr_2ZrO_6$ single crystal obtained in Example 2.

The structure of the sample 3 was investigated in the same manner as in Example 1. The X-ray diffraction pattern of the sample 3 is shown in FIG. 9. As shown in FIG. 9, it was possible to measure a clear diffraction point. Lattice constants were calculated from the diffraction point by the least squares method, which showed that the lattice constant a was 0.573063 nm±0.000024 nm, b was 0.609683 nm±0.000025 nm, c was 0.847059 nm±0.000034 nm and the β angle was 97.16628°±0.0129°.

As a result of investigating the crystal structure of the sample 3 in the same manner as in Example 1, it was found that the sample 3 belonged to the monoclinic system. Furthermore, in the same manner as in Example 1, four thin pieces of the sample 3 each having a thickness of 0.1 mm were produced, and the relative densities were calculated. As a result, these relative densities were each 99.8%, 99.7%, 99.9% or 100%. As described above, a complex oxide having a relative density of 99.5% or more was obtained.

The sample 3 had a crystal structure shown in FIG. 4 for which no analogue crystal structures have been thus far reported. $Li_4Sr_2ZrO_6$ belonged to a space group P2₁/n, two kinds of 4e sites in the crystal structure were occupied by lithium ions, one 4e site was occupied by strontium, a 2c site was occupied by zirconium and three kinds of 4e sites were occupied by oxygen. The R factor, which indicates the degree of reliability of this crystal structural analysis, was 3.72%, and thus the crystal structural analysis result can be said to be reasonable.

Example 3

(Production of Powdery Mixed Raw Material of $Li_3SrLaZrO_6$)

A powdery mixed raw material was obtained in the same manner as in Example 1 except that 11.1527 g of lithium carbonate $Li_2CO_3$, 14.8549 g of strontium carbonate $SrCO_3$, 13.6599 g of lanthanum oxide $La_2O_3$ and 10.3325 g of zirconium oxide $ZrO_2$ were used. Regarding the mole proportions Li:Sr:La:Zr of metals in this powdery mixed raw material, there were an excess of lithium (20 mol %) and an excess of strontium (20 mol %) with respect to the mole proportions of a target object $Li_3SrLaZrO_6$. That is, the chemical composition of this powdery mixed raw material corresponds to $Li_{4.4}Sr_{2.2}ZrO_6$ ($Li_{(4-x)y}Sr_{(2-x)z}La_xZrO_6$ where x=1, y=1.2 and z=1.2).

(Production of Rod-Shaped Raw Material)

A compact was obtained in the same manner as in Example 1 except that 18.427 g of the powdery mixed raw material obtained above was used. This compact had a cylindrical shape that was 1.1 cm in diameter and 8.0 cm in height. After that, the compact was baked under the same conditions as in Example 1 to obtain a rod-shaped raw material. The obtained rod-shaped raw material had a cylindrical shape that was 1.0 cm in diameter and 8.0 cm in height.

(Growth of Crystal of $Li_3SrLaZrO_6$)

Figure 10:
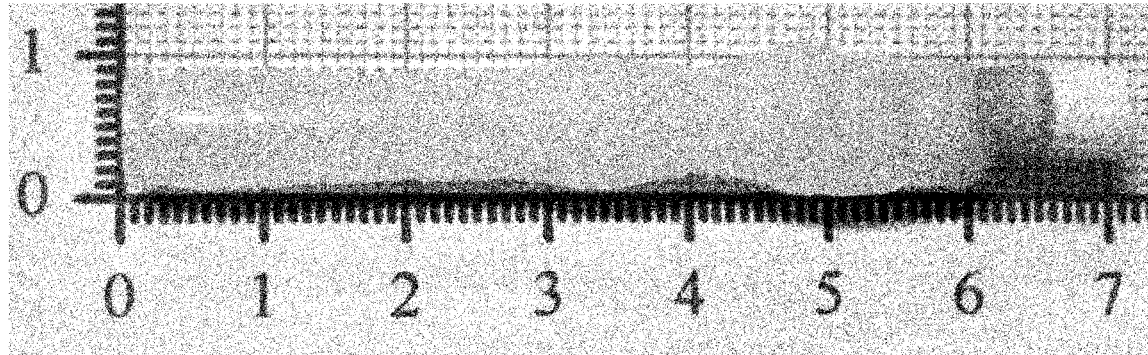
FIG. 10 is a photograph of the external appearance of a $Li_3SrLaZrO_6$ single crystal obtained in Example 3.

A high-density complex oxide $Li_3SrLaZrO_6$ (hereinafter, referred to as "sample 4" in some cases) was grown in the same manner as in Example 1, and the chemical composition was analyzed. The external appearance of the sample 4 is shown in FIG. 10. As shown in FIG. 10, it was possible to produce a high-density crystal of $Li_3SrLaZrO_6$ having a length of 6 cm.

(Evaluation of Crystal of $Li_3SrLaZrO_6$)

Figure 11:
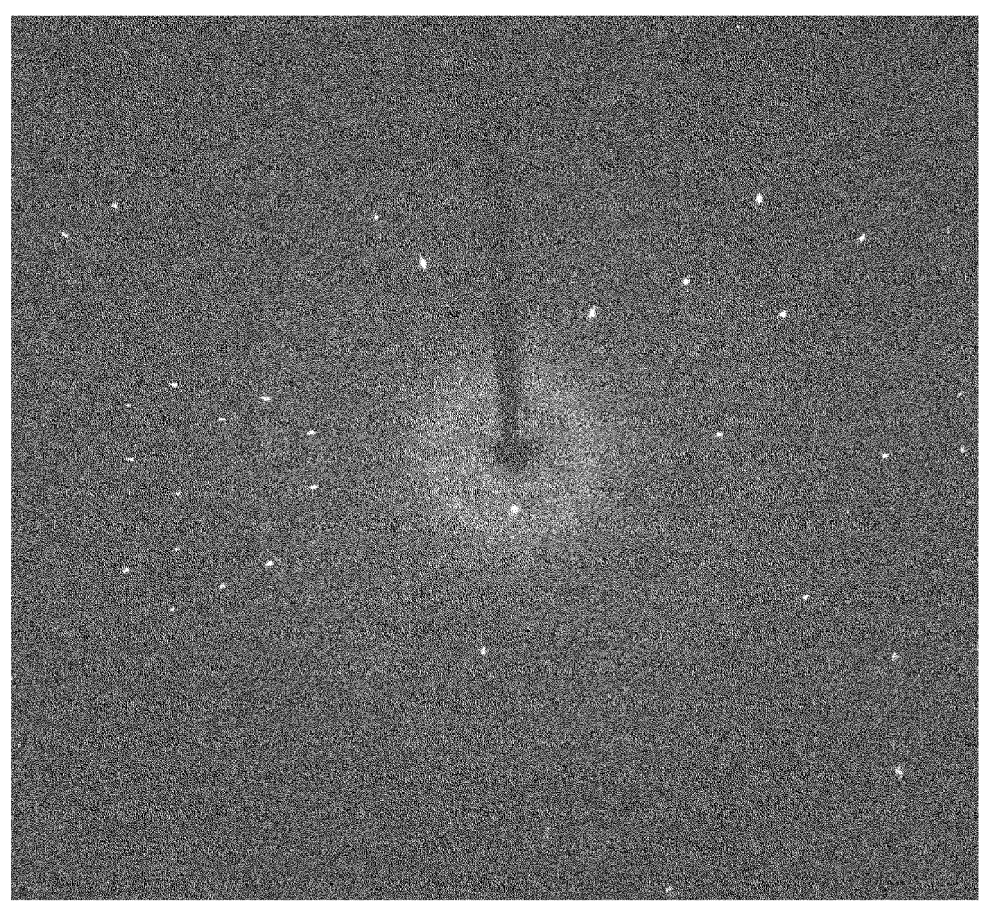
FIG. 11 is a single crystal X-ray diffraction pattern of the $Li_3SrLaZrO_6$ single crystal obtained in Example 3.

The structure of the sample 4 was investigated in the same manner as in Example 1. The X-ray diffraction pattern of the sample 4 is shown in FIG. 11. As shown in FIG. 11, it was possible to measure a clear diffraction point. Lattice constants were calculated from the diffraction point by the least squares method, which showed that the lattice constant a was 0.585780 nm±0.000220 nm, b was 0.639450 nm 0.00250 nm, c was 0.85860 nm±0.000300 nm and the β angle was 96.84870° 0.01210°.

As a result of investigating the crystal structure of the sample 4 in the same manner as in Example 1, it was found that the sample 4 belonged to the monoclinic system. Furthermore, in the same manner as in Example 1, four thin pieces of the sample 4 each having a thickness of 0.1 mm were produced, and the relative densities were calculated. As a result, these relative densities were each 99.9%, 99.9%, 100% or 99.7%. As described above, a complex oxide having a relative density of 99.5% or more was obtained.

The sample 4 had a crystal structure shown in FIG. 4 for which no analogue crystal structures have been thus far reported. $Li_3SrLaZrO_6$ belonged to a space group $P2_1/n$, two kinds of 4e sites in the crystal structure were occupied by lithium ions, one 4e site was occupied by strontium, a 2c site was occupied by zirconium and three kinds of 4e sites were occupied by oxygen. The R factor, which indicates the degree of reliability of this crystal structural analysis, was 3.12%, and thus the crystal structural analysis result can be said to be reasonable.

Combination of the results of Example 1 to Example 3 show that the lattice constants of $Li_{4-x}Sr_{2-x}La_xZrO_6$ (0≤x≤1.0) were a of 0.57 nm±0.02 nm, b of 0.62 nm 0.02 nm, c of 0.84 nm±0.02 nm and a β angle of 97.0°±0.2°.

INDUSTRIAL APPLICABILITY

The complex oxide of the present application having high density and represented by $Li_{4-x}Sr_{2-x}La_xZrO_6$ (0≤x≤1.0) can be used as a solid electrolyte material or the like for all-solid-state lithium ion secondary batteries.

The invention claimed is:

1. A complex oxide having a chemical composition represented by $Li_{4-x}Sr_{2-x}La_xZrO_6$ (0≤x≤1.0) being monoclinic and belonging to space group $P2_1/n$.

2. The complex oxide according to claim 1, wherein a lithium ion conductivity is $6.0×10^{-4}$ S/cm or more.

3. The complex oxide according to claim 1, wherein an activation energy is 0.20 eV or more and 0.30 eV or less.

4. The complex oxide according to claim 1, wherein a lattice constant a is 0.57 nm±0.02 nm, b is 0.62 nm±0.02 nm, c is 0.84 nm±0.02 nm and a β angle is 97.0°±0.2°.

5. The complex oxide according to claim 1, wherein two kinds of 4e sites in a crystal structure are occupied by lithium ions, one 4e site is occupied by strontium or occupied by a solid solution of strontium and lanthanum, a 2c site is occupied by zirconium and three kinds of 4e sites are occupied by oxygen.

6. The complex oxide according to claim 1, wherein a relative density is 100%.

7. An all-solid-state lithium ion secondary battery comprising:
a positive electrode;
a negative electrode; and
a solid electrolyte,
wherein the solid electrolyte is composed of the complex oxide according to claim 1.

8. A method for producing a complex oxide which has a chemical composition represented by $Li_{4-x}Sr_{2-x}La_xZrO_6$ (0≤x≤1.0), having a relative density of 99% or more, being monoclinic and belonging to a space group $P2_1/n$, comprising melting step melting
at least a part of a raw material having a chemical composition represented by $Li_{(4-x)y}Sr_{(2-x)z}La_xZrO_6$ (0≤x≤1.0, 1<y and 1<z) to form a molten portion, and
moving step moving the molten portion is moved at a movement speed of 8 mm/h or faster.

9. The method for producing a complex oxide according to claim 8, wherein the movement speed is 8 mm/h or faster and 19 mm/h or slower.

10. The method for producing a complex oxide according to claim 8, wherein the raw material has a rod shape, and the raw material is melted and grow a complex oxide while the raw material is rotated on a surface perpendicular to a longitudinal direction of the raw material at a rotation speed of 20 rpm or faster.

11. The method for producing a complex oxide according to claim 10, wherein the rotation speed is 20 rpm or faster and 60 rpm or slower.

* * * * *